(12) United States Patent
Duijghuisen et al.

(10) Patent No.: US 8,889,798 B2
(45) Date of Patent: Nov. 18, 2014

(54) PAINT COMPOSITION

(75) Inventors: Gerardus Johannes Jozef Duijghuisen, Boxtel (NL); Johannes Petrus Rocus Maria Broeders, Waalwijk (NL)

(73) Assignee: Durable Compliant Coatings B.V. (NL)

( * ) Notice: Subject to any disclaimer, the term of this patent is extended or adjusted under 35 U.S.C. 154(b) by 276 days.

(21) Appl. No.: 12/865,419

(22) PCT Filed: Feb. 2, 2009

(86) PCT No.: PCT/NL2009/000020
§ 371 (c)(1),
(2), (4) Date: Sep. 1, 2010

(87) PCT Pub. No.: WO2009/096778
PCT Pub. Date: Aug. 6, 2009

(65) Prior Publication Data
US 2011/0003913 A1    Jan. 6, 2011

(30) Foreign Application Priority Data
Feb. 1, 2008 (NL) ........................ 1034986

(51) Int. Cl.
*C08G 18/10* (2006.01)
*C08G 18/32* (2006.01)
*C09D 175/04* (2006.01)

(52) U.S. Cl.
CPC .............. *C08G 18/10* (2013.01); *C09D 175/04* (2013.01)
USPC ........... 525/452; 525/453; 525/454; 525/455; 525/456; 525/457

(58) Field of Classification Search
CPC .. C08G 18/10; C08G 18/603; C08G 18/3228; C08G 2150/50; C09J 175/02; C09J 175/04
USPC ................................................ 525/452–460
See application file for complete search history.

(56) References Cited

U.S. PATENT DOCUMENTS

| | | | |
|---|---|---|---|
| 4,138,299 A | 2/1979 | Bolgiano | |
| 5,236,741 A * | 8/1993 | Zwiener et al. | 427/385.5 |
| 5,489,704 A * | 2/1996 | Squiller et al. | 560/35 |
| 5,580,945 A * | 12/1996 | Wade et al. | 528/49 |
| 6,465,539 B1 * | 10/2002 | Weikard et al. | 522/90 |
| 6,833,424 B2 | 12/2004 | Milhem | |
| 7,169,876 B2 | 1/2007 | Asher | |
| 8,129,026 B2 * | 3/2012 | Barancyk et al. | 428/423.1 |
| 2001/0031369 A1 * | 10/2001 | Reusmann | 428/483 |
| 2004/0210010 A1 * | 10/2004 | Smith | 525/476 |
| 2005/0106395 A1 | 5/2005 | Asher | |
| 2005/0119438 A1 | 6/2005 | Leon et al. | |
| 2005/0282933 A1 | 12/2005 | Patel | |
| 2006/0046068 A1 | 3/2006 | Barancyk | |
| 2006/0047091 A1 * | 3/2006 | Smith | 525/474 |
| 2006/0116488 A1 * | 6/2006 | Baumgart et al. | 525/452 |
| 2007/0066786 A1 * | 3/2007 | Hanson et al. | 528/44 |
| 2007/0173348 A1 * | 7/2007 | Rajagopalan et al. | 473/351 |
| 2008/0008866 A1 * | 1/2008 | Smith | 428/220 |

FOREIGN PATENT DOCUMENTS

| | | |
|---|---|---|
| EP | 1038897 A | 3/2000 |
| EP | 1277876 | 7/2002 |
| WO | 2005087874 | 9/2005 |

OTHER PUBLICATIONS

International Search Report for International Patent Application No. PCT/NL2009/000020 mailed Mar. 25, 2009.
Bayer Material Science, Desmodur® N75 MPA/X, Product Data Sheet, Edition Dec. 11, 2006, pp. 1-3.
"Standard Test Methods for Evaluating Drying or Curing During Film Formation of Organic Coatings Using Mechanical Recorders," Annual Book of ASTM Standards, vol. 6, No. 1, pp. 1-4 (2003).
Office Action issued in related European application No. 09705026.4 and dated Mar. 3, 2014.
Office Action issued in related European application No. 09705026.4 and dated Sep. 3, 2014.

* cited by examiner

*Primary Examiner* — Mike M Dollinger
(74) *Attorney, Agent, or Firm* — Brian R. Dorn; Barnes & Thornburg LLP

(57) ABSTRACT

The present invention relates to a paint composition comprising a component A, being a basic binder, and a component B, being an isocyanate compound. The present invention also relates to the use of the present paint composition as a paint or top coat. The present invention moreover relates to an object of which at least one surface is coated with at least one layer of the present paint composition.

20 Claims, No Drawings

PAINT COMPOSITION

CROSS-REFERENCE TO RELATED APPLICATIONS

The present application claims the benefit of priority to International Patent Application No. PCT/NL2009/000020 filed 2 Feb. 2009, which further claims the benefit of priority to Netherlands Patent Application No. 1034986 filed 1 Feb. 2008, the contents of which are incorporated herein by reference in their entirety.

The present invention relates to a paint composition comprising a component A, being a basic binder, and a component B, being an isocyanate compound.

Such a paint composition is known from U.S. Pat. No. 6,833,424 and U.S. Pat. No. 7,169,876, which disclose a two-component coating composition comprising a polyisocyanate (in an excess amount) combined with a polyaspartic ester.

Such a paint composition is referred to as a "dual cure" composition. This relates to the two separate reaction mechanisms that play a role in the curing of the paint composition, viz. in the first place the chemical crosslinking (also known as "fast curing" on account of the short reaction time) that results from the reaction between the —NH group of the polyaspartic ester and the isocyanate group of the polyisocyanate. The second reaction mechanism playing a role is the so-called wet curing of the excess amount of polyisocyanate when it comes into contact with water.

The coating composition according to these two U.S. patents consists of the combination of a polyaspartic ester with an amount of polyisocyanate that is greater than the normal stoichiometric amount.

Such compositions combine the fast curing properties of the reaction of the polyisocyanate with the polyaspartic ester with the slower wet curing properties of the reaction of the polyisocyanate with moisture. This curing results in the formation of urea compounds according to the aforementioned two reaction mechanisms.

Polyisocyanates as used in the aforementioned U.S. patents are typically obtained from isocyanate monomers.

A polymeric coating is disclosed in EP 1 038 897. Due to the high viscosity of such a paint coating, said coating is only suitable for thick film technologies. A drawback of this technology is the fact that the applied coating does not degas easily, so that gas bubbles may remain behind in the paint coating, which adversely affects the quality of the coating. In thick film technologies, one-layer coatings having a thickness of at least 250 μm to a few millimeters are usually applied.

US 2005/282,933 discloses a coating comprising a modified polyisocyanate and a polyaspartic acid. Said coating has an index of 1.05. Said polyisocyanates have an NCO weight percentage of 23 wt. %. A coating according to said US application is suitable for use as road marking paint.

US 2006/046068 discloses a coating comprising a prepolymer and polyaspartic acid having an index of 1.05. A prepolymer according to said application is prepared from an isoforon diisocyanate having an NCO weight percentage of 37.8 wt. %.

One object of the present invention is to provide a paint composition having improved drying properties.

Another object of the present invention is to provide a paint composition having good adhesion to the surface to which the paint composition will be applied.

Yet another object of the present invention is to provide a paint composition that offers excellent protection against weather influences.

It is also an object of the present invention to provide a paint composition that degases easily.

One or more of the above objects is/are achieved by the present paint composition as referred to in the introduction, which is characterised in that component B is an isocyanate prepolymer.

Via the use of the isocyanate prepolymer, the present invention provides the possibility of using other basic binders as component A in the paint composition besides polyaspartic acid (component A). That way the paint composition can be enhanced with special properties.

Isocyanate prepolymers are typically obtained in a reaction between polyisocyanates and polyols. Isocyanate prepolymers have a so-called NCO content of maximally 16 wt. %. The NCO weight percentage indicates the percentage of the molecular weight of the isocyanate prepolymers that consists of NCO groups. NCO stands for isocyanate group (N=nitrogen; C=carbon; O=oxygen). Polyisocyanates, on the other hand, have an NCO weight percentage in excess of 16 wt. %.

Component A according to the present invention is preferably selected from the group consisting of hydroxyacrylate, polyaspartic ester, polyester polyol, epoxy, alkyd, vinyl, silicone epoxide and chlorinated rubber, and one or more combinations hereof.

A preferable paint composition is a composition whose index, being the ratio between reactive groups of component B and the reactive groups of component A, ranges between 1.0 and 3.0, and component A has been selected from the group consisting of hydroxyacrylate, polyaspartic ester, polyester polyol, epoxy and silicone epoxide, and one or more combinations hereof.

The paint composition according to the present invention comprises a basic binder (component A) which is in a certain ratio caused to react with an isocyanate prepolymer (component B). The ratio is such that the reactive groups of component B are present in an amount that is at least equal to the stoichiometric amount relative to the reactive groups of the basic binder, viz. index a 1. The use of an excess amount, resulting in an index greater than 1, is also known as overindexing.

Some examples of suitable basic components (component A) will follow below.

Examples of a hydroxyacrylate are the commercially available Desmophen A160, Desmophen A365 (both supplied by Bayer) and Setalux 1152 (supplied by Nuplex Resins). Hydroxyacrylate contains hydroxyl groups as its reactive groups.

Examples of a polyaspartic ester are the commercially available Desmophen NH1420 and NH1520 (supplied by Bayer). Polyaspartic ester contains amine groups as its reactive groups.

Examples of a polyester polyol are the commercially available Desmophen 670, 651 and RD181 (supplied by Bayer). Polyester polyol contains hydroxyl groups as its reactive groups.

Examples of an epoxy are the commercially available Epikote 1007, 1009, 1001 and 828 (Hexion Specialty Chemicals). Epoxy contains epoxy groups as its reactive groups.

Examples of a silicone epoxide are the commercially available Silikoftal ED and Silikopon EF (both supplied by Degussa). Silicone epoxide contains epoxy groups as its reactive groups.

The index preferably ranges between 1.5 and 3.0 because the best properties are obtained in this range, with respect to for example tack-free time and adhesion (see the examples).

The index preferably ranges between 1.7 and 3.0, more preferably between 1.7 and 2.7, most preferably between 1.7 and 2.5. If component A has been selected from the group comprising hydroxyacrylate and polyester polyol, it is preferable for the index to range between 1.7 and 3.0, more preferably between 1.7 and 2.7, most preferably between 1.7 and 2.5. The inventors have found that within these ranges the paint compositions according to the present invention in particular have good properties in the fields of tack-free time, adhesion and gloss properties (see the examples).

If component A has been selected from the group consisting of alkyd, vinyl and chlorinated rubber and one or more combinations thereof, component B will be present in the paint composition according to the present invention in an amount of at most 20 wt. %, relative to the total weight of the paint composition. The inventors have found that within these ranges the paint composition according to the present invention has good properties, for example in the field of tack-free time.

Some examples of an alkyd basic binder are the commercially available Uralac AL210, AK418, AK419 and AM352 (supplied by DSM). Alkyd contains hydroxyl groups as its reactive groups. Some examples of a vinyl basic binder are the commercially available Laroflex MP45 and MP35 (supplied by BASF). And as far as a chlorinated rubber basic binder is concerned they are for example the commercially available Pergut S5, S10 and S20 (supplied by Bayer).

The presence of 0.5 wt. % of component B relative to the total weight of the paint composition already has a positive effect on for example the tack-free time and the adhesion of the paint composition.

It is more preferable for the amount of component B to range between 5 wt. % and 20 wt. %. The present inventors have shown that in this range good results are obtained in the fields of the aforementioned properties.

The isocyanate prepolymers used in the present invention are preferably aromatic isocyanate prepolymers, aliphatic isocyanate prepolymers or one or more combinations thereof. Use of an aliphatic isocyanate prepolymer in the present paint composition results in a paint coating having improved durability. Use of an aromatic isocyanate prepolymer in the paint composition results in faster curing of the paint coating. By using both aliphatic and aromatic isocyanate prepolymers in the paint composition, the favourable properties of both isocyanate prepolymers will be combined.

The isocyanate prepolymers used in the present invention have an NCO weight percentage of maximally 16 wt. %. The present inventor has found that a paint composition comprising such prepolymers having the aforesaid NCO weight percentages produces good results regarding adhesion, tack-free time, gloss properties and film formation compared to paint compositions based on isocyanate (see the examples).

The present isocyanate prepolymers have a functionality of more than 2.0, which leads to good results as regards adhesion, tack-free time, gloss properties and film formation in comparison with paint compositions based on isocyanate polymers having a functionality of maximally 2.0.

Some commercially available aromatic isocyanate prepolymers are known under the names of Desmodur E21, E23, E28 and E1361 (supplied by Bayer). Some examples of commercially available aliphatic isocyanate prepolymers are known under the names of Desmodur E3265 and E3370 (supplied by Bayer).

It is preferable for the composition according to the present invention to comprise one or more aliphatic isocyanate prepolymers on account of the improved durability.

As already mentioned above, it is possible to use a mixture of different basic binders as component A. The use of such mixtures will make it possible to obtain different paint compositions, each having different properties that are advantageous under different conditions. This gives the paint composition according to the present invention a broad range of application.

Hydroxyacrylate is particularly suitable for use as a basic binder for obtaining a top layer having good weather resistance. It can also be used to obtain corrosion-resistant single-layer systems having excellent adhesion to different surfaces.

Polyaspartic ester is particularly suitable for use as a basic binder to obtain so-called "super high solids" top coats having good weather resistance. There are possible formulations having a solids content of more than 60%, up to even more than 90 volume %.

Polyester polyol is particularly suitable for use as a basic binder to obtain top coats having a very high gloss and excellent flow behaviour.

Epoxy is particularly suitable for use as a basic binder to obtain rust-resistant primers and/or intermediate coats having very short tack-free times. Epoxy moreover allows excellent adhesion to moist, poorly cleaned substrates and/or surfaces.

Alkyd is suitable for use as a basic binder to obtain a primer, intermediate layer and top layer for which limited or simple protection is required. The addition of isocyanate prepolymers (component B) broadens the field of application in comparison with paints that contain only component A, so that even a coating applied at low temperatures will dry through (winter paint).

Vinyl is particularly suitable for use as a basic binder for applications in which high moisture contents are to be expected. Examples are high levels of spattering, immersion and underground use.

Silicone epoxide is particularly suitable for obtaining "super high solids" top coats having excellent weather resistance, chemical resistance and flexibility, and corrosion-resistant intermediate coats.

Chlorinated rubber is particularly suitable for use as a basic binder for applications in which high moisture contents are to be expected. Examples are high levels of spattering, immersion and underground use. This basic binder is also suitable for applications calling for extreme flexibility.

The paint composition according to the present invention may also contain certain components such as pigments, colour and functional pigments (for example for obtaining corrosion-resistant properties), surfactants, anti-foaming agents, solvents, diluents, fillers, carrier materials, binders, plasticizers, drying agents, catalysts, preservants, wetting agents, barrier-strengthening agents such as clay and mica, and capillary-active substances, agents influencing the viscosity and softeners.

The paint composition according to the present invention has a viscosity of lower than or equal to 5 Pa·s (50 poise) at room temperature (25° C.). As a result of the low viscosity, the applied paint composition can degas easily after being applied to the desired surface. The advantage of proper degassing is that the gas bubbles that have formed can easily escape due to the low viscosity of the composition. Paint coatings in which said gas bubbles remain behind are sensitive to, for example, moisture, cold, heat and other weather conditions. As a result of the presence of said gas bubbles, cracks may for example form in the paint coating under the influence of such conditions. Furthermore, said paint coatings will be easily damaged when an object impacts with the paint coating. Since the paint coating consisting of the paint composition according to the present invention does not contain any gas bubbles, because gas bubbles can easily escape, the paint coating is thus less sensitive to the aforesaid conditions, and the paint coating will less easily crack or be damaged. The paint composition according to the present invention preferably has a viscosity of lower than or equal to 3 Pa·s (30 poise) at room temperature, even more preferably a viscosity lower than or equal to 2 Pa·s (20 poise).

As a result of the low viscosity of the paint composition according to the present invention, said paint composition can be applied to a surface as a thin film. A single layer of the paint composition has a thickness of maximally 150 µm, preferably maximally 100 µm. Since the paint composition can be applied as a thin film, less paint composition is required for coating a surface in comparison with a paint composition having a higher viscosity, which is advantageous from an economic point of view.

The present invention also relates to the use of the present paint composition as a paint or top coat.

The present paint composition is suitable for application to surfaces that may or may not have been treated, such as metal, for example steel and aluminium, plastics, for example PVC, and wood. It will of course be clear that this list is not limitative and that other surfaces are also possible.

The present invention also relates to an object of which at least one surface is coated with at least one layer of the present paint composition.

The layer of paint on the object concerned preferably has a loss of gloss that ranges between 0 and 10, in particular 1-8, measured according to ISO11507:1997 (after 1000 hours of irradiation with UV-A light).

It is also preferable for the layer of paint on the object concerned to have a flexibility ranging between 1 and 9 mm measured according to ISO1520:1999. At a lower flexibility the layer of paint may be brittle, resulting in insufficient durability.

In addition to that it is preferable if the layer of paint on the present object has a thickness of maximally 150 µm, preferably maximally 100 µm, if one layer is used.

The present invention will be further elucidated with reference to a number of examples.

TABLE 1

Survey of examples

| Example No. | Component A | Component B |
|---|---|---|
| Example 1 (E 1) | hydroxyacrylate | isocyanate prepolymer |
| Comparative example 1 (C E 1) | hydroxyacrylate | polyisocyanate |
| Example 2 (E 2) | polyaspartic acid | isocyanate prepolymer |
| Comparative example 2 (C E 2) | polyaspartic acid | polyisocyanate |
| Example 3 (E 3) | polyester polyol | isocyanate prepolymer |
| Comparative example 3 (C E 3) | polyester polyol | polyisocyanate |
| Example 4 (E 4) | epoxy | isocyanate prepolymer |
| Comparative example 4 (C E 4) | epoxy | polyamino amide |
| Example 5 (E 5) | silicone epoxide | isocyanate prepolymer |
| Comparative example 5 (C E 5) | silicone epoxide | aminosilaan |
| Example 6 (E 6) | vinyl | isocyanate prepolymer |
| Comparative example 6 (C E 6) | vinyl | polyisocyanate |
| Example 7 (E 7) | chlorinated rubber | isocyanate prepolymer |
| Comparative example 7 (C E 7) | chlorinated rubber | polyisocyanate |
| Comparative example 8 (C E 8) | vinyl | — |
| Comparative example 9 (C E 9) | chlorinated rubber | — |
| Comparative example 10 (C E 10) | alkyd | — |
| Example 11 (E 11) | alkyd | isocyanate prepolymer |
| Comparative example 12 (C E 12) | alkyd | polyisocyanate |

A first test carried out by the present inventors is the determination of the so-called tack-free time, viz. the drying rate of the paint. This test was carried out using a drying time recorder according to ASTM D 5895-03.

Table 2 shows the tack-free time of the various paint compositions as a function of the employed index. The paint compositions shown in Table 2 comprise a basic binder (component A) selected from the group consisting of hydroxyacrylate, polyaspartic ester, polyester polyol, epoxy or silicone epoxide.

TABLE 2 tack-free time (in minutes) of examples 1-5 and comparative examples 1-5 at different index values.

| Index | E 1 | C E 1 | E 2 | C E 2 | E 3 | C E 3 | E 4 | C E 4 | E 5 | C E 5 |
|---|---|---|---|---|---|---|---|---|---|---|
| 0.8 | n.d. | n.d. | n.d. | n.d. | n.d. | n.d. | n.d. | <240 | n.d. | <90 |
| 1 | <30 | <60 | <10 | <30 | <45 | <90 | <120 | <300 | <90 | <120 |
| 1.3 | <45 | <90 | <10 | <45 | <60 | <150 | <120 | >360 | <90 | <240 |
| 1.5 | <60 | <150 | <10 | <45 | <60 | <240 | <120 | >360 | <120 | >360 |
| 1.7 | <60 | <240 | <15 | <45 | <90 | >360 | <150 | n.d. | <150 | >360 |
| 2 | <90 | >360 | <15 | <45 | <120 | >360 | <150 | n.d. | <150 | >360 |
| 2.2 | <120 | >360 | <20 | <60 | <150 | >360 | <150 | n.d. | <240 | >360 |
| 2.5 | <240 | >360 | <30 | <60 | <240 | >360 | <180 | n.d. | <240 | >360 |
| 3 | >360 | >360 | <30 | <120 | >360 | >360 | <180 | n.d. | <240 | >360 |
| 4 | >360 | >360 | <120 | >360 | >360 | >360 | >360 | n.d. | >360 | >360 | n.d. = not determined

EXAMPLES

Table 1 describes a number of paint compositions which the present inventors subjected to a number of measurements whose results are shown in the subsequent Tables 2-7. Compositions according to the present invention are referred to as "example" and compositions used for comparison are referred to as "comparative example".

The results of the tack-free time measurement clearly show that paint compositions according to the present invention have shorter tack-free times than the comparative paint compositions. This holds for both low and high indexes. The advantage of this is that the paint dries faster, so that any additional coats of paint or lacquer can be applied sooner, or the coated object can be stacked or transported sooner. in addition, it will in many cases no longer be necessary to accelerate the drying process by means of heating, for example in an oven.

Table 3 shows the results of adhesion tests using different surfaces and paint compositions according to the present invention as a function of the index. The adhesion tests were carried out according to ISO2409:1992.

TABLE 3 adhesion tests

| Example No. | Index | Blasted steel | Galvanized steel | Aluminium | PVC | St 2 steel[#] |
|---|---|---|---|---|---|---|
| E 1 | 1.0 | 2 | 1 | 0 | 1 | n.d. |
|  | 1.7 | 4 | 4 | 2 | 4 | n.d. |
|  | 2.0 | 5 | 4 | 2 | 4 | n.d. |
|  | 2.5 | 5 | 5 | 4 | 5 | n.d. |
| E 2 | 1.0 | 3 | 3 | 2 | 2 | n.d. |
|  | 1.7 | 4 | 4 | 3 | 3 | n.d. |
|  | 2.0 | 5 | 5 | 4 | 4 | n.d. |
|  | 2.5 | 5 | 5 | 4 | 5 | n.d. |
| E 3 | 1.0 | 2 | 1 | 0 | 1 | n.d. |
|  | 1.7 | 4 | 4 | 2 | 4 | n.d. |
|  | 2.0 | 5 | 4 | 2 | 4 | n.d. |
|  | 2.5 | 5 | 5 | 4 | 5 | n.d. |
| E 4 | 1.0 | 5 | 2 | 4 | 3 | 4 |
|  | 1.7 | 5 | 4 | 5 | 4 | 4 |
|  | 2.0 | 5 | 4 | 5 | 5 | 5 |
|  | 2.5 | 5 | 5 | 5 | 5 | 5 |
| E 5 | 1.0 | 2 | 1 | 0 | 1 | n.d. |
|  | 1.7 | 4 | 4 | 2 | 4 | n.d. |
|  | 2.0 | 5 | 4 | 2 | 4 | n.d. |
|  | 2.5 | 5 | 5 | 4 | 5 | n.d. |

[#]Steel thoroughly cleaned by hand so that it can be observed by the naked eye that the surface is free of visible oil, grease, dirt and of loose mill scale, rust, coats of paint and foreign materials.
n.d.: not determined
The following criteria were used:
0: totally unsatisfactory adhesion
1: almost totally unsatisfactory adhesion
2: partially unsatisfactory adhesion
3: unsatisfactory adhesion
4: satisfactory adhesion
5: excellent adhesion These results clearly show that the paint compositions according to the present invention have excellent adhesion properties with respect to different substrates and/or surfaces.

Table 4 shows the tack-free time of two paint compositions according to the present invention (E6 and E7) and of comparative paint compositions (CE6, CE7, CE8 and CE9).

TABLE 4 tack-free time (in minutes) of examples 6-7 and comparative examples 6-9 at different amounts of component B relative to the overall weight.

| Weight ratio (wt. %) | E 6 | C E 6 | E 7 | C E 7 | C E 8 | C E 9 |
|---|---|---|---|---|---|---|
| 0 | — | — | — | — | <360 | <240 |
| 5 | <240 | <300 | <90 | <180 | — | — |
| 10 | <180 | <300 | <60 | <150 | — | — |
| 20 | <180 | <240 | <45 | <120 | — | — |
| 30 | >360 | >360 | >360 | >360 | — | — |

The results presented in Table 4 show that paint compositions according to the present invention have a shorter tack-free time at the same amount of composition B than the comparative paint compositions. This holds for both high and low weight ratios of the isocyanate prepolymer.

Table 5 shows the results of film-formation tests at different temperatures obtained for paint compositions according to the present invention (E 11) and for comparative paint compositions (C E 10 and C E 11) in which alkyd was used as the basic binder (component A). The comparative paint compositions consisted of alkyd containing 0 wt. %, 5 wt. % or 10 wt. % polyisocyanate. The employed paint compositions according to the present invention comprised alkyd and 5 wt. % or 10 wt. % isocyanate prepolymer.

TABLE 5

Results of film-formation tests at different temperatures obtained for example 11 and comparative examples 10 and 11 at different weight ratios of component B relative to component A.

| Temperature (° C.) | C E 10 | E 11 (5 wt. %) | E 11 (10 wt. %) | C E 11 (5 wt. %) | C E 11 (10 wt. %) |
|---|---|---|---|---|---|
| 0 | 0 | 4 | 4 | 0 | 0 |
| 5 | 0 | 4 | 4 | 1 | 1 |
| 10 | 2 | 5 | 5 | 2 | 2 |
| 15 | 4 | 5 | 5 | 5 | 5 |
| 20 | 5 | 5 | 5 | 5 | 5 |

The following criteria were used:
0: totally unsatisfactory film formation
1: almost totally unsatisfactory film formation
2: partially unsatisfactory film formation
3: unsatisfactory film formation
4: satisfactory film formation
5: excellent film formation The results show that the film-formation properties of the present paint compositions are excellent at both high and low temperatures. The results also clearly show that the present paint compositions have better film-formation properties at lower temperatures than the comparative paint compositions.

Tables 2, 4 and 5 clearly show that the paint compositions according to the present invention have better properties than comparative paint compositions. This is evident from both the tack-free times and the adhesion properties. In the case of the paint compositions comprising alkyd and an isocyanate prepolymer this is evident from the excellent film-formation properties at the different temperatures. It may hence be concluded that one or more of the objects of the present invention are achieved by the present paint compositions.

Tables 6 and 7 show the loss of gloss (angle of 60°) after 1000 hours of irradiation with UV-A light measured according to ISO11507:1997, and the water resistancy measured according to ISO2812-1:1993, method 2, of paint compositions according to the present invention. The figures given in Table 6 for loss of gloss are all the values at the beginning of the measurement (initial gloss) and at the end of the measurement, with the loss of gloss calculated from these values indicated between brackets.

TABLE 6 loss of gloss measured according to ISO11507:1997 and water resistancy (minutes) measured according to ISO2812-1:1993 of examples 1-4 at different index values.

| | Loss of gloss | | | | Water resistancy | | | |
|---|---|---|---|---|---|---|---|---|
| Index | E 1 | E 2 | E 3 | E 4 | E 1 | E 2 | E 3 | E 4 |
| 1.0 | 92 > 89 (3) | 90 > 81 (9) | 91 > 76 (15) | n.d. | <15 | <5 | <20 | <20 |
| 1.3 | 92 > 90 (2) | 91 > 85 (6) | 92 > 82 (10) | n.d. | <20 | <5 | <30 | <30 |

TABLE 6-continued loss of gloss measured according to ISO11507:1997 and water resistancy (minutes) measured according to ISO2812-1:1993 of examples 1-4 at different index values.

| | Loss of gloss | | | | Water resistancy | | | |
|---|---|---|---|---|---|---|---|---|
| Index | E 1 | E 2 | E 3 | E 4 | E 1 | E 2 | E 3 | E 4 |
| 1.5 | 94 > 92 (2) | 94 > 90 (4) | 94 > 87 (7) | n.d. | <30 | <5 | <30 | <30 |
| 1.7 | 94 > 93 (1) | 94 > 91 (3) | 94 > 89 (5) | n.d. | <30 | <5 | <60 | <60 |
| 2 | 94 > 93 (1) | 94 > 93 (1) | 94 > 90 (4) | n.d. | <60 | <10 | <90 | <90 |
| 2.2 | 94 > 93 (1) | 94 > 93 (1) | 94 > 91 (3) | n.d. | <90 | <10 | <120 | <120 |
| 2.5 | 94 > 93 (1) | 94 > 93 (1) | 94 > 91 (3) | n.d. | <180 | <10 | <180 | <180 |
| 3 | 94 > 93 (1) | 94 > 93 (1) | 94 > 91 (3) | n.d. | >360 | <10 | >360 | >360 |
| 4 | n.d. | n.d. | n.d. | n.d. | >360 | <30 | >360 | >360 | n.d. = not determined

TABLE 7

Water resistancy (minutes) measured according to ISO2812-1: 1993 of examples 6-7 and comparative examples 8-9 at different amounts of component B relative to the total weight of the composition.

| Weight ratio (wt. %) | E 6 | E 7 | C E 8 | C E 9 |
|---|---|---|---|---|
| 0 | — | — | <300 | <120 |
| 5 | <180 | <60 | — | — |
| 10 | <150 | <45 | — | — |
| 20 | <150 | <30 | — | — |
| 30 | n.d. | n.d. | — | — | n.d. = not determined

Tables 8 and 9 show the flexibility of compositions according to the present invention (E1-E5 and E6-E7, respectively). The flexibility is measured according to ISO 1520:1999, and is also referred to as "cupping".

TABLE 8 flexibility (in mm) measured according to ISO 1520:1999 as a function of the index.

| Index | E 1 | E 2 | E 3 | E 4 | E 5 |
|---|---|---|---|---|---|
| 1 | 1 | 3 | 2 | 6 | 5 |
| 1.7 | 5 | >9 | 7 | >9 | >9 |
| 2 | >9 | >9 | >9 | >9 | >9 |
| 2.5 | >9 | >9 | >9 | >9 | >9 |

Table 8 clearly shows that the paint compositions according to the present invention have good flexibility at different indices.

TABLE 9 flexibility (in mm) measured according to ISO 1520: 1999 as a function of the amount of component B relative to the total composition.

| Weight ratio (wt. %) | E 6 | E 7 | C E 8 | C E 9 |
|---|---|---|---|---|
| 0 | — | — | 4 | 6 |
| 5 | 6 | 7 | — | — |
| 10 | >9 | >9 | — | — |
| 20 | >9 | >9 | — | — |

Table 9 clearly shows that the paint compositions according to the present invention containing different amounts of component B have good flexibility.

The invention claimed is:

1. A paint composition comprising a component A, being a basic binder, and a component B, being an isocyanate compound,
    wherein the component B is an isocyanate prepolymer,
    wherein an index, being the ratio between reactive groups of component B and the reactive groups of component A ranges between 1.7 and 3.0,
    wherein the isocyanate prepolymer has an NCO weight percentage of less than or equal to 16 wt. %,
    wherein the component A comprises a polyaspartic acid ester,
    wherein the paint composition has a viscosity lower than or equal to 5 Pa·s (50 poise) at room temperature, and
    wherein the paint composition has a reduced tack-free time.

2. A paint composition according to claim 1, wherein the index ranges between 1.7 and 2.7.

3. A paint composition according to claim 1, wherein a weight ratio of component B relative to the total weight of the paint composition is at most 20 wt. % and that component A further includes an alkyd, vinyl and chlorinated rubber, and one or more combinations hereof.

4. A paint composition according to claim 3, wherein the weight ratio ranges between 5 wt. % and 20 wt. %.

5. A paint composition according to claim 1, wherein the component B is an aromatic isocyanate prepolymer and/or an aliphatic isocyanate prepolymer.

6. A paint composition according to claim 5, wherein the component B is an aliphatic isocyanate prepolymer.

7. A paint composition according to claim 2, wherein the index ranges between 1.7 and 2.5.

8. A method of using a paint composition, the method comprising:
    providing a basic binder, component A, for the paint composition;
    providing an isocyanate compound, component B, wherein the component B is an isocyanate prepolymer; and
    applying a resulting paint composition of component A and component B as a paint or top coat of an object,
    wherein an index, being the ratio between reactive groups of component B and the reactive groups of component A, ranges between 1.7 and 3.0,
    wherein the isocyanate prepolymer has an NCO weight percentage of less than or equal to 16 wt. %, and
    wherein the component A includes a polyaspartic acid ester,
    wherein the paint composition has a viscosity lower than or equal to 5 Pa·s (50 poise) at room temperature and a reduced tack-free time.

9. An object comprising at least one surface coated with at least one layer of the paint composition according to claim 1.

10. An object according to claim 9, wherein the at least one layer has a loss of gloss ranging from 0 to 10 measured according to ISO11507:1997, after 1000 hours of irradiation with UV-A light.

11. An object according to claim 9, wherein the at least one layer has a flexibility ranging from 1 to 9 mm measured according to ISO1520:1999.

12. A paint composition according to claim 8 wherein the viscosity is lower than or equal to 3 Pa·s (30 poise) at room temperature.

13. A paint composition according to claim 8, wherein the viscosity is lower than or equal to 2 Pa·s (20 poise) at room temperature.

14. The paint composition according to claim 1, wherein the component A further comprises a hydroxyacrylate, a polyester polyol, or combinations thereof.

15. The method according to claim 8, wherein the component A further comprises a hydroxyacrylate, a polyester polyol, or combinations thereof.

16. The paint composition according to claim 1, wherein the paint composition has a solids content of greater than 60% by volume.

17. The object of claim 9, wherein the layer of the paint composition has a maximum thickness of 150 μ.m.

18. The method of claim 8, wherein the paint or top coat of an object has a maximum layer thickness of 150 μm.

19. A paint composition comprising
   a) a binder comprising a polyaspartic acid ester; and
   b) an isocyanate prepolymer having an NCO weight percentage of less than or equal to 16wt%;
   wherein a ratio between reactive groups of the isocyanate prepolymer and the binder is between 1.7 and 3.0,
   wherein the paint composition has
   i) a viscosity lower than or equal to 5 Pa·s (50 poise) at room temperature,
   ii) a solids content of greater than 60% by volume, and
   iii) a reduced tack-free time.

20. The paint composition of claim 19, wherein the paint composition has a maximum layer thickness of 150 μm.

* * * * *

UNITED STATES PATENT AND TRADEMARK OFFICE
CERTIFICATE OF CORRECTION

| | |
|---|---|
| PATENT NO. | : 8,889,798 B2 |
| APPLICATION NO. | : 12/865419 |
| DATED | : November 18, 2014 |
| INVENTOR(S) | : Gerardus Johannes Jozef Duijghuisen et al. |

It is certified that error appears in the above-identified patent and that said Letters Patent is hereby corrected as shown below:

In the Claims

Please amend claim 1 as follows:
col. 10, line 24, add a --,-- after the words "component A"
--component A,-- col. 10, line 27, delete the "." in the symbol "wt.%" and replace with the following:
--wt%--

Please amend claim 2 as follows:
col. 10, line 34, delete the word "A" at the beginning of the sentence and replace with the following:
--The--

Please amend claim 3 as follows:
col. 10, line 36, delete the word "A" at the beginning of the sentence and replace with the following:
--The-- col. 10, line 38, delete the "." in the symbol "wt.%" and replace with the following:
--wt%--

Please amend claim 4 as follows:
col. 10, line 41, delete the word "A" at the beginning of the sentence and replace with the following:
--The--

Signed and Sealed this
Tenth Day of March, 2015

Michelle K. Lee
*Deputy Director of the United States Patent and Trademark Office* col. 10, line 42, delete the "." in the two instances of the symbol
"wt.%" and replace with the following:
--wt%--

Please amend claim 5 as follows:
col. 10, line 43, delete the word "A" at the beginning of the sentence and
replace with the following:
--The--

Please amend claim 6 as follows:
col. 10, line 46, delete the word "A" at the beginning of the sentence and
replace with the following:
--The--

Please amend claim 7 as follows:
col. 10, line 48, delete the word "A" at the beginning of the sentence and
replace with the following:
--The--

Please amend claim 8 as follows:
col. 10, line 59, delete the following "and the reactive groups of component A" and
replace with the following:
--and reactive groups of component A-- col. 10, line 62, delete the "." in the symbol "wt.%" and replace with
the following:
--wt%-- col. 10, line 63, delete the word "includes" and insert in its place the word
--comprises--

Please amend claim 10 as follows:
col. 11, line 3, delete the word "An," at the beginning of the sentence and
replace with the following:
--The--

Please amend claim 11 as follows:
col. 11, line 7, delete the word "An," at the beginning of the sentence and
replace with the following:
--The--

Please amend claim 12 as follows:
col. 11, line 10, delete the word "A" at the beginning of the sentence and
replace with the following:
--The--

CERTIFICATE OF CORRECTION (continued)
U.S. Pat. No. 8,889,798 B2 col. 11, line 10, delete "claim 8" and replace with the following:
--claim 1--

Please amend claim 13 as follows:
col. 11, line 13, delete the word "A" at the beginning of the sentence and replace with the following:
--The-- col. 11, line 13, delete "claim 8" and replace with the following:
--claim 1--

Please amend claim 19 as follows:
col. 12, line 11, add a space between the number "16" and the symbol "wt%"
--16 wt%--